United States Patent
Radwan et al.

(10) Patent No.: US 12,555,309 B2
(45) Date of Patent: Feb. 17, 2026

(54) ROBUSTIFYING NeRF MODEL NOVEL VIEW SYNTHESIS TO SPARSE DATA

(71) Applicant: Google LLC, Mountain View, CA (US)

(72) Inventors: Noha Radwan, Zurich (CH); Jonathan Tilton Barron, Alameda, CA (US); Benjamin Joseph Mildenhall, London (GB); Seyed Mohammad Mehdi Sajjadi, Berlin (DE); Michael Niemeyer, Cologne (DE)

(73) Assignee: GOOGLE LLC, Mountain View, CA (US)

( * ) Notice: Subject to any disclaimer, the term of this patent is extended or adjusted under 35 U.S.C. 154(b) by 552 days.

(21) Appl. No.: 18/012,270

(22) PCT Filed: Oct. 24, 2022

(86) PCT No.: PCT/US2022/047539
§ 371 (c)(1),
(2) Date: Dec. 22, 2022

(87) PCT Pub. No.: WO2023/086198
PCT Pub. Date: May 19, 2023

(65) Prior Publication Data
US 2024/0273811 A1    Aug. 15, 2024

Related U.S. Application Data

(60) Provisional application No. 63/279,455, filed on Nov. 15, 2021.

(51) Int. Cl.
*G06T 15/20* (2011.01)
*G06V 10/82* (2022.01)

(52) U.S. Cl.
CPC ............ *G06T 15/205* (2013.01); *G06V 10/82* (2022.01)

(58) Field of Classification Search
None
See application file for complete search history.

(56) References Cited

U.S. PATENT DOCUMENTS

| | | | |
|---|---|---|---|
| 11,308,659 B2 * | 4/2022 | Duckworth | G06T 15/20 |
| 11,704,844 B2 * | 7/2023 | Duckworth | G06T 7/90 382/159 |
| 12,002,150 B2 * | 6/2024 | Zhao | G06T 15/506 |

(Continued)

OTHER PUBLICATIONS

Jain et al, "Putting NeRF on a Diet: Semantically Consistent Few-Shot View Synthesis", arXiv:2104.00677v1, Apr. 1, 2021, 15 pages (Year: 2021).*

(Continued)

*Primary Examiner* — Anand P Bhatnagar
(74) *Attorney, Agent, or Firm* — DORITY & MANNING P.A.

(57) ABSTRACT

Systems and methods for training a neural radiance field model can include the use of image patches for ground truth training. For example, the systems and methods can include generating patch renderings with a neural radiance field model, comparing the patch renderings to ground truth patches from ground truth images, and adjusting one or more parameters based on the comparison. Additionally and/or alternatively, the systems and methods can include the utilization of a flow model for mitigating and/or minimizing artifact generation.

19 Claims, 11 Drawing Sheets

(56) References Cited

U.S. PATENT DOCUMENTS

| | | | | |
|---|---|---|---|---|
| 12,100,074 | B2* | 9/2024 | Duckworth | G06T 15/08 |
| 12,166,955 | B2* | 12/2024 | Matsuda | G02B 30/34 |
| 2022/0036602 | A1* | 2/2022 | Duckworth | G06T 7/90 |
| 2022/0237834 | A1* | 7/2022 | Duckworth | G06T 15/08 |
| 2022/0414953 | A1* | 12/2022 | Shen | G06T 7/0004 |
| 2023/0027890 | A1* | 1/2023 | Zhao | G06T 15/04 |
| 2023/0306655 | A1* | 9/2023 | Duckworth | G06T 15/08 |
| 2025/0014236 | A1* | 1/2025 | Duckworth | G06T 11/001 |

OTHER PUBLICATIONS

Barron et al., "Mip-NeRF: A Multiscale Representation for Anti-Aliasing Neural Radiance Fields", arXiv:2103.13415v3, Aug. 14, 2021.

Chibane et al., "Stereo Radiance Fields (SRF): Learning View Synthesis for Sparse Views of Novel Scenes", arXiv:2104.06935v1, Apr. 14, 2021, 10 pages.

Jain et al., "Putting NeRF on a Diet: Semantically Consistent Few-Shot View Synthesis", arXiv:2104.00677v1, Apr. 1, 2021, 15 pages.

Kangle Deng et al., "Depth-supervised NeRF: Fewer Views and Faster Training for Free", arXiv:2107.02791v2, Apr. 29, 2022, 13 pages.

Mildenhall et al., NeRF: Representing Scenes as Neural Radiance Fields for View Synthesis, arXiv:2003.08934v2, 25 pages.

Wang et al., "IBRNet: Learning Multi-View Image-Based Rendering", arXiv:2102.13090v2, Apr. 6, 2021, 15 pages.

Yu et al., "pixelNeRF: Neural Radiance Fields from One or Few Images", arXiv:2012.02190v3, May 30, 2021, 20 pages.

Goodfellow et al., "Generative Adversarial Nets", Department of Computer Science and Operational Research, Montreal University, Neural Information Processing Systems, 10 pages.

International Preliminary Report on Patentability for Application No. PCT/US2022/047539, mailed May 30, 2024, 12 pages.

Meng et al. "GNeRF: GAN-based Neural Radiance Field without Posed Camera", IEEE/ CVF Computer Vision Foundation, Shanghai Engineering Research Center of Intelligent Vision and Imaging, School of Information Science and Technology, Shanghai Tech University, University of California, 11 pages.

\* cited by examiner

ROBUSTIFYING NeRF MODEL NOVEL VIEW SYNTHESIS TO SPARSE DATA

RELATED APPLICATIONS

This application claims priority under 35 U.S.C. § 371 to and the benefit of International Patent Application No. PCT/US2022/047539 filed on Oct. 24, 2022, which claims priority to and the benefit of U.S. Provisional Patent Application No. 63/279,455, filed Nov. 15, 2021. U.S. Provisional Patent Application No. 63/279,455 and International Patent Application No. PCT/US2022/047539 are hereby incorporated by reference in their entirety.

FIELD

The present disclosure relates generally to training a neural radiance field model by utilizing image patches and a flow model. More particularly, the present disclosure relates to segmenting training images into patches and comparing generated patch renderings in order to train the neural radiance field model.

BACKGROUND

Neural Radiance Fields (NeRFs) have emerged as a powerful representation for the task of novel-view synthesis due to their simplicity and state-of-the-art performance. While allowing for photorealistic renderings of unseen viewpoints when many input views are available, the performance drops significantly when only sparse inputs are available. Such a multitude of images may however not always be feasible or easily obtainable for applications such as AR/VR, autonomous driving, and robotics.

While NeRF performs well for dense inputs, the performance of NeRF models can drop significantly for sparse inputs, thereby limiting NeRF model applications for areas where obtaining dense input data is challenging (e.g., robotic applications and StreetView where the scene changes frequently between captures).

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining an image dataset. In some implementations, the image dataset can include a plurality of images and a plurality of respective three-dimensional locations, and the plurality of images can be descriptive of a scene. The operations can include generating one or more ground truth patches based on the plurality of images. Each ground truth patch can include a proper subset of one of the plurality of images. In some implementations, the operations can include processing one or more of the plurality of three-dimensional locations of the image dataset with a neural radiance field model to generate one or more view synthesis renderings. The one or more view synthesis renderings can be descriptive of different views of the scene. The operations can include evaluating a loss function that evaluates a difference between the one or more view synthesis renderings and the one or more ground truth patches and adjusting one or more parameters of the neural radiance field model based at least in part on the loss function.

In some implementations, generating one or more ground truth patches can include processing an image of the plurality of images to determine a portion of the image descriptive of an object in the scene and generating the one or more ground truth patches by segmenting the portion of the image descriptive of the object. The operations can include obtaining an input dataset. The input dataset can include one or more respective input locations. The operations can include processing the input dataset with the neural radiance field model to generate a novel view rendering and providing the novel view rendering for display. In some implementations, the plurality of images can be descriptive of one or more input views of the scene. The novel view rendering can be descriptive of one or more output views. The one or more output views can differ from the one or more input views.

In some implementations, the one or more view synthesis renderings can include one or more predicted patches. The loss function can include at least one of a perceptual loss or a discriminator loss. In some implementations, adjusting the one or more parameters of the neural radiance field model can include adjusting the one or more parameters to maximize a log likelihood of output renderings from the neural radiance field model. The operations can include processing the one or more view synthesis renderings with a discriminator model to generate a discriminator output and adjusting the one or more parameters of the neural radiance field model based on the discriminator output. In some implementations, the discriminator model can include a convolutional discriminator. The discriminator model can be part of a generative adversarial network. In some implementations, the loss function can include an adversarial loss.

Another example aspect of the present disclosure is directed to a computer-implemented method. The method can include obtaining, by a computing system including one or more processors, a training dataset. The training dataset can include a plurality of images and a plurality of respective three-dimensional locations, and the plurality of images can depict a scene. The method can include generating, by the computing system, a plurality of image patches based on the plurality of images. In some implementations, each image patch can include a proper subset of one of the plurality of images. The method can include processing, by the computing system, the plurality of respective three-dimensional locations with a neural radiance field model to generate one or more patch renderings. In some implementations, the one or more patch renderings can be descriptive of views of the scene. The method can include obtaining, by the computing system, a flow model. The flow model can include a pretrained model trained on a flow training dataset. The method can include processing, by the computing system, the one or more patch renderings with the flow model to generate a flow output and adjusting, by the computing system, one or more parameters of the neural radiance field model based at least in part on the flow output.

In some implementations, the method can include evaluating, by the computing system, a ground truth loss function that evaluates a difference between the one or more patch renderings and one or more of the plurality of image patches and adjusting, by the computing system, one or more parameters of the neural radiance field model based at least in part on the ground truth loss function. The method can include storing, by the computing system, the plurality of image patches in a database. In some implementations, the one or more patch renderings can include one or more color predictions and one or more depth predictions. The flow output can include a geometry regularization.

Another example aspect of the present disclosure is directed to one or more non-transitory computer-readable media that collectively store instructions that, when executed by one or more computing devices, cause the one or more computing devices to perform operations. The operations can include obtaining an input dataset. In some implementations, the input dataset can include one or more locations, and the one or more locations can be descriptive of a position in an environment. The operations can include processing the input dataset with a neural radiance field model to generate one or more novel view renderings. The novel view rendering can include a view of at least a portion of the environment. In some implementations, the neural radiance field model may have been trained by comparing patches from a training dataset to generated predicted view renderings, and the patches can be generated by segmenting one or more training images. The operations can include providing the one or more novel view renderings for display.

In some implementations, the neural radiance field model can include a first model configured to process an input dataset and a second model configured to process a neural radiance field output generated by a neural radiance field model. Processing the image dataset with the neural radiance field model can include processing the input dataset with the first model to generate neural radiance field data. In some implementations, processing the image dataset with the neural radiance field model can include processing the neural radiance field with the second model to generate the one or more novel view renderings. The input dataset can include one or more view directions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
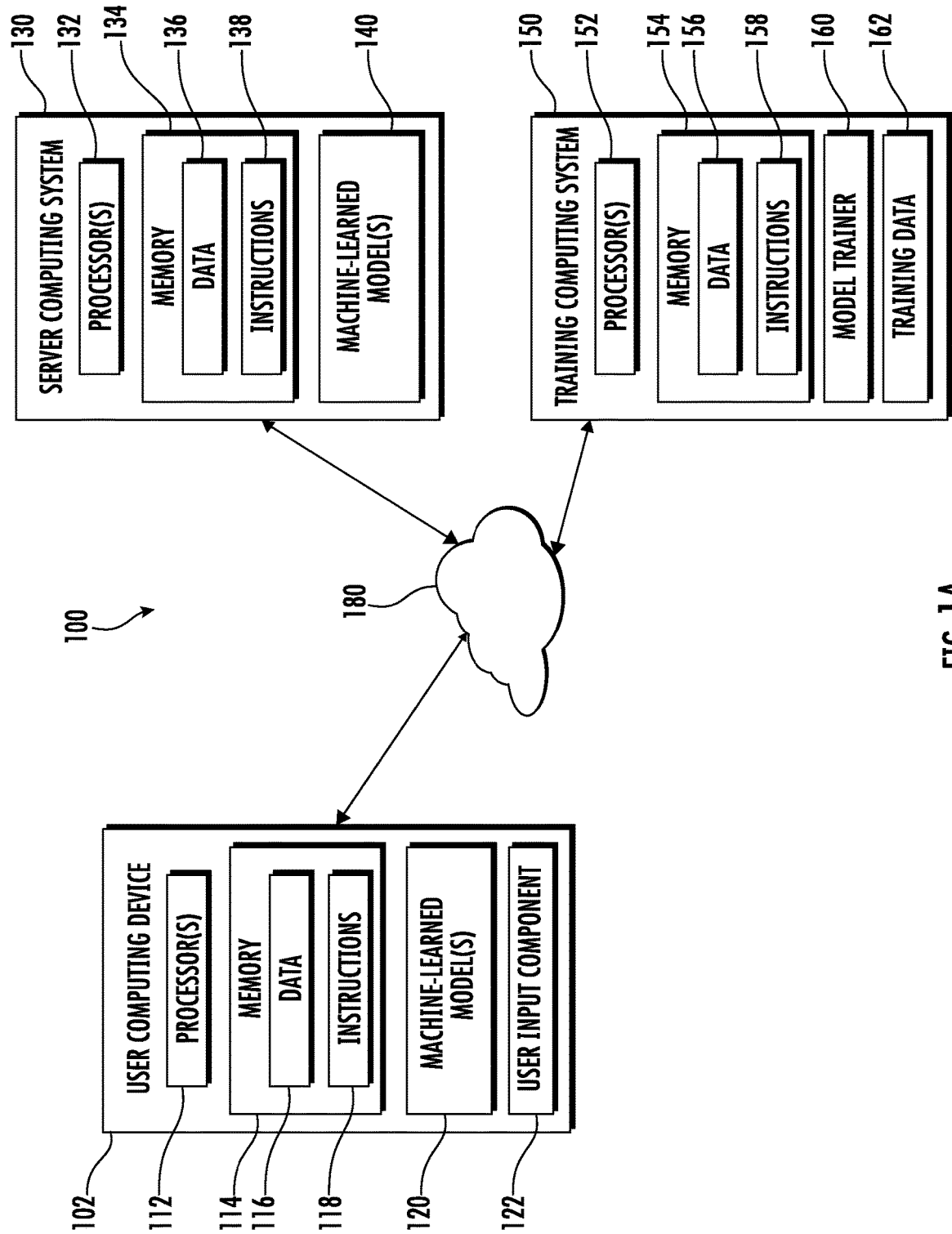
FIG. 1A depicts a block diagram of an example computing system that performs neural radiance field model training and inference according to example embodiments of the present disclosure.

Reference numerals that are repeated across plural figures are intended to identify the same features in various implementations.

DETAILED DESCRIPTION

Overview

Generally, the present disclosure is directed to systems and methods for training a neural radiance field model by utilizing geometric priors. For example, the systems and methods can include obtaining an image dataset. In some implementations, the image dataset can include a plurality of images and a plurality of respective three-dimensional locations. The plurality of images may depict a scene. One or more ground truth images can be generated based on the plurality of images. Each ground truth patch can include a proper subset of one of the plurality of images. One or more of the plurality of three-dimensional locations of the image dataset can be processed with a neural radiance field model to generate one or more view synthesis renderings. The one or more view synthesis renderings can be descriptive of different views of the object. A loss function can be evaluated based on a difference between the one or more view synthesis renderings and the one or more ground truth patches. One or more parameters of the neural radiance field model can then be adjusted based at least in part on the loss function.

Training the one or more neural radiance field models can further include the use of a flow model. For example, training the one or more neural radiance field models can include obtaining a training dataset. The training dataset can include a plurality of images and a plurality of respective three-dimensional locations, and the plurality of images can depict a scene. A plurality of image patches can be generated based on the plurality of images. Each image patch may include a proper subset of one of the plurality of images. The plurality of respective three-dimensional locations can be processed with a neural radiance field model to generate one or more patch renderings. In some implementations, the one or more patch renderings can be descriptive of views of the scene differing from views depicted in the plurality of images. A flow model can be trained based at least in part on the plurality of image patches. The one or more patch renderings can be processed with the flow model to generate a flow output. The systems and methods can include adjusting one or more parameters of the neural radiance field model based at least in part on the flow output.

The trained neural radiance field model can then be utilized for model inference to generate novel view renderings. The systems and methods for model inference can include obtaining an input dataset. The input dataset can include one or more locations. In some implementations, the one or more locations can be descriptive of a position in an environment. The systems and methods can include processing the input dataset with a neural radiance field model to generate one or more novel view renderings. The one or more novel view renderings can include a view of at least a portion of the environment. In some implementations, the neural radiance field model can be trained by comparing patches from a training dataset to generate predicted view renderings. The patches may be generated by segmenting one or more training images. The one or more novel view renderings can then be provided for display.

The systems and methods disclosed herein can be utilized for robotic applications and autonomous vehicles where the amount of training data for each scene is limited to the data captured by the robot in real-time and frequently changes with the environment. Similarly, the systems and methods can be beneficial for augmented-reality (AR) and/or virtual-reality (VR) scenarios where the user-data is limited to that captured by the device.

The systems and methods disclosed herein can train a neural radiance field model on a sparse amount of data (e.g., four to nine images). In particular, the systems and methods can break-up the training images into patches and train on the patches (e.g., the renderings can be patch renderings that can be compared against patches of a ground truth image). The patches can provide more geometric awareness and detail to the model. The training may involve focusing on one sector of a training image or a training dataset and building out in order to reduce variance.

The systems and methods disclosed herein can involve training with ground truth patch training and normalization utilizing a flow model (e.g., a normalizing flow model which can be trained on the training dataset or a different flow training dataset separate from the scene-specific training dataset). The systems and methods can utilize the ground truth patch training to train a neural radiance field model with sparse training inputs. The systems and methods can utilize the flow model for mitigating artifacts in outputs.

The systems and methods can include obtaining an image dataset. The image dataset can include one or more images and one or more respective three-dimensional locations, and the one or more images can be descriptive of a scene.

One or more ground truth patches can be generated based on the one or more images. In some implementations, each ground truth patch can include a proper subset of one of the one or more images. Additionally and/or alternatively, generating one or more ground truth patches can include processing an image of the plurality of images to determine a portion of the image descriptive of an object in the scene and generating the one or more ground truth patches by segmenting the portion of the image descriptive of the object.

The one or more three-dimensional locations of the image dataset can be processed with a neural radiance field model to generate one or more view synthesis renderings. In some implementations, the one or more view synthesis renderings can be descriptive of different views of the scene. In some implementations, the one or more images can be descriptive of one or more input views of the scene, and the one or more view synthesis renderings can be descriptive of an output view. The output view can differ from the one or more input views. The one or more view synthesis renderings can include one or more predicted patches.

The systems and methods for training can include evaluating a loss function that evaluates a difference between the one or more view synthesis renderings and the one or more ground truth patches. In some implementations, the loss function can include a perceptual loss, an adversarial loss, and/or a discriminator loss.

In some implementations, the systems and methods can include adjusting one or more parameters of the neural radiance field model based at least in part on the loss function.

Adjusting the one or more parameters of the neural radiance field model can include adjusting the one or more parameters to maximize a log likelihood of output renderings from the neural radiance field model.

In some implementations, the systems and methods can include obtaining an input dataset. The input dataset can include one or more respective input locations. The input dataset can be processed with the neural radiance field model to generate a novel view rendering, and the novel view rendering can be provided for display. In some implementations, the one or more images may be descriptive of one or more input views of the scene, and the novel view rendering can be descriptive of one or more output views. The one or more output views can differ from the one or more input views.

Alternatively and/or additionally, the systems and methods can include processing the one or more view synthesis renderings with a discriminator model to generate a discriminator output and adjusting the one or more parameters of the neural radiance field model based on the discriminator output. In some implementations, the discriminator model can include a convolutional discriminator, and the discriminator model can be part of a generative adversarial network.

In some implementations, the training may be completed on a pixel by pixel basis. For example, the systems and methods can sample points throughout the scene for pixel by pixel analysis.

Additionally and/or alternatively, the neural radiance field model can be trained using a flow model. For example, the systems and methods can include obtaining a training dataset. The training dataset can include one or more images and one or more respective three-dimensional locations, and the one or more images can depict a scene.

One or more image patches can be generated based on the one or more images. Each image patch can include a proper subset of one of the plurality of images. The image patches can include sixteen pixel by sixteen pixel patches or can be a variety of other sizes. In some implementations, the patches can be generated by equally spitting up an image into pieces. Alternatively and/or additionally, the patches may be generated through randomly sampling portions of the images.

The one or more respective three-dimensional locations can be processed with a neural radiance field model to generate one or more patch renderings. In some implementations, the one or more patch renderings can be descriptive of views of the scene differing from views depicted in the plurality of images. The one or more patch renderings can include one or more color predictions (e.g., a red-green-blue value prediction) and one or more depth predictions (e.g., a volume density prediction). The depth rendering can utilize a prior to remove or penalize spikes in depths.

A flow model can be trained based at least in part on the one or more image patches. In some implementations, the flow model can be a normalized flow model trained on a patch database. The patch database can include images descriptive of a variety of different scenes. The flow model may be a general model that can be used for a variety of scenes, objects, etc. In some implementations, the flow model can be trained to be aware of geometry and color transitions. In some implementations, the flow model can be a pretrained model obtained from a server computing system. For example, the flow model may include a pre-trained model trained on an image dataset that includes a plurality of images associated with a plurality of different scenes. The pre-trained flow model can be trained on full images and may be trained such that a singular model can be utilized to train a plurality of neural radiance field models being trained on a plurality of different respective scenes.

The one or more patch renderings can be processed with the flow model to generate a flow output. In some implementations, the flow output can include a geometry regularization and/or a color normalization.

The systems and methods can include adjusting one or more parameters of the neural radiance field model based at least in part on the flow output.

Additionally and/or alternatively, the systems and methods can include evaluating a ground truth loss function that evaluates a difference between the one or more patch renderings and one or more of the plurality of image patches and adjusting one or more parameters of the neural radiance field model based at least in part on the ground truth loss function.

In some implementations, the systems and methods can include storing the plurality of image patches in a database. The database can be utilized by a future user or the same user in order to train a different neural radiance field model or a different flow model.

The trained neural radiance field model can then be utilized to generate novel view renderings.

For example, the systems and methods can include obtaining an input dataset. In some implementations, the input dataset can include one or more locations, and the one or more locations can be descriptive of a position in an environment. The input dataset can include one or more view directions.

The input dataset can be processed with a neural radiance field model to generate one or more novel view renderings. In some implementations, the novel view rendering can include a view of at least a portion of the environment.

The neural radiance field model may have been trained by comparing patches from a training dataset to generate predicted view renderings. The patches can be generated by segmenting one or more training images. In some implementations, the neural radiance field model can include a first model configured to process an input dataset and a second model configured to process a neural radiance field output generated by a neural radiance field model. Processing the image dataset with the neural radiance field model can include processing the input dataset with the first model to generate neural radiance field data. Additionally and/or alternatively, processing the image dataset with the neural radiance field model can include processing the neural radiance field with the second model to generate the one or more novel view renderings.

The one or more novel view renderings can then be provided for display. The one or more novel view renderings can be of a same or comparable size to a training image size. Additionally and/or alternatively, the one or more novel view renderings can be descriptive of a view of a scene that differs from a view included in the training dataset.

The systems and methods of the present disclosure provide a number of technical effects and benefits. As one example, the system and methods can train a neural radiance field model for generating a view synthesis rendering. More specifically, the systems and methods can utilize ground truth image patches in order to train the neural radiance field model with sparse inputs. For example, in some implementations, the systems and methods can include generating a plurality of patches for an image, which can then be compared against patch renderings in order to train a neural radiance field model.

Another technical benefit of the systems and methods of the present disclosure is the ability to mitigate artifact generation by utilizing a flow model. For example, the training can include processing the patch renderings with a flow model to generate a flow output which can include a distribution that can be backpropagated to the neural radiance field model to train the model. The flow model can aid in providing more realistic geometry and color.

Another example technical effect and benefit relates to improved computational efficiency and improvements in the functioning of a computing system. For example, the systems and methods disclosed herein can leverage patches and a flow model in order to train a neural radiance field model with a small amount of training data (e.g., four images). Moreover, the systems and methods disclosed herein can be applicable to train a model for realistic and informed novel view synthesis rendering with a small amount of training data.

With reference now to the Figures, example embodiments of the present disclosure will be discussed in further detail.

Example Devices and Systems

FIG. 1A depicts a block diagram of an example computing system 100 that performs view synthesis rendering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural radiance field models 120. For example, the neural radiance field models 120) can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. Example neural radiance field models 120 are discussed with reference to FIGS. 2-5.

In some implementations, the one or more neural radiance field models 120 can be received from the server computing system 130 over network 180, stored in the user computing device memory 114, and then used or otherwise implemented by the one or more processors 112. In some implementations, the user computing device 102 can implement multiple parallel instances of a single neural radiance field model 120 (e.g., to perform parallel view rendering across multiple instances of positions and/or view directions).

More particularly, the one or more neural radiance field models can process an input dataset to generate a view rendering. The input dataset may include one or more three-dimensional positions and one or more two-dimensional view directions. The neural radiance field model can process the position, or location, in an observation space, and can map the position and direction to a color prediction and a volume density prediction, which can then be utilized to generate the view rendering. The view rendering may be a novel view rendering depicting a predicted image of a view not depicted in the training dataset.

Additionally or alternatively, one or more neural radiance field models 140 can be included in or otherwise stored and implemented by the server computing system 130 that communicates with the user computing device 102 according to a client-server relationship. For example, the neural radiance field models 140 can be implemented by the server computing system 140 as a portion of a web service (e.g., a view rendering service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural radiance field models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the neural radiance field models 120 and/or 140 based on a set of training data 162. The training data 162 can include, for example, a plurality of training images, a plurality of respective three-dimensional locations, and/or one or more two-dimensional view directions. In some implementations the plurality of training images may be deconstructed, or segmented, into a plurality of ground truth patches for each respective training image.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160) includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162.

In such implementations, the models 120 can be both trained and used locally at the user computing device 102. In some of such implementations, the user computing device 102 can implement the model trainer 160 to personalize the models 120 based on user-specific data.

Figure 1B:
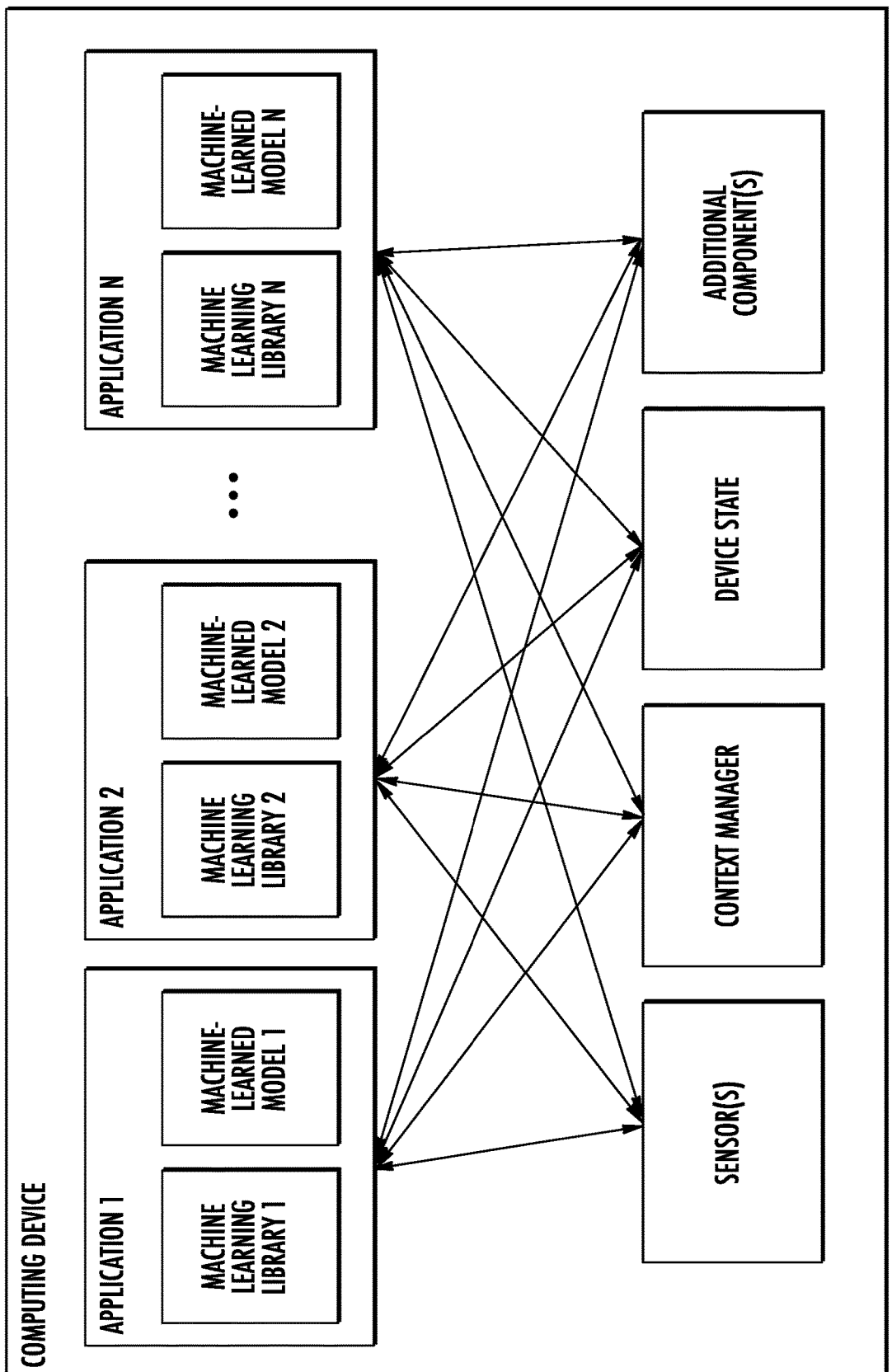
FIG. 1B depicts a block diagram of an example computing device that performs neural radiance field model training and inference according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
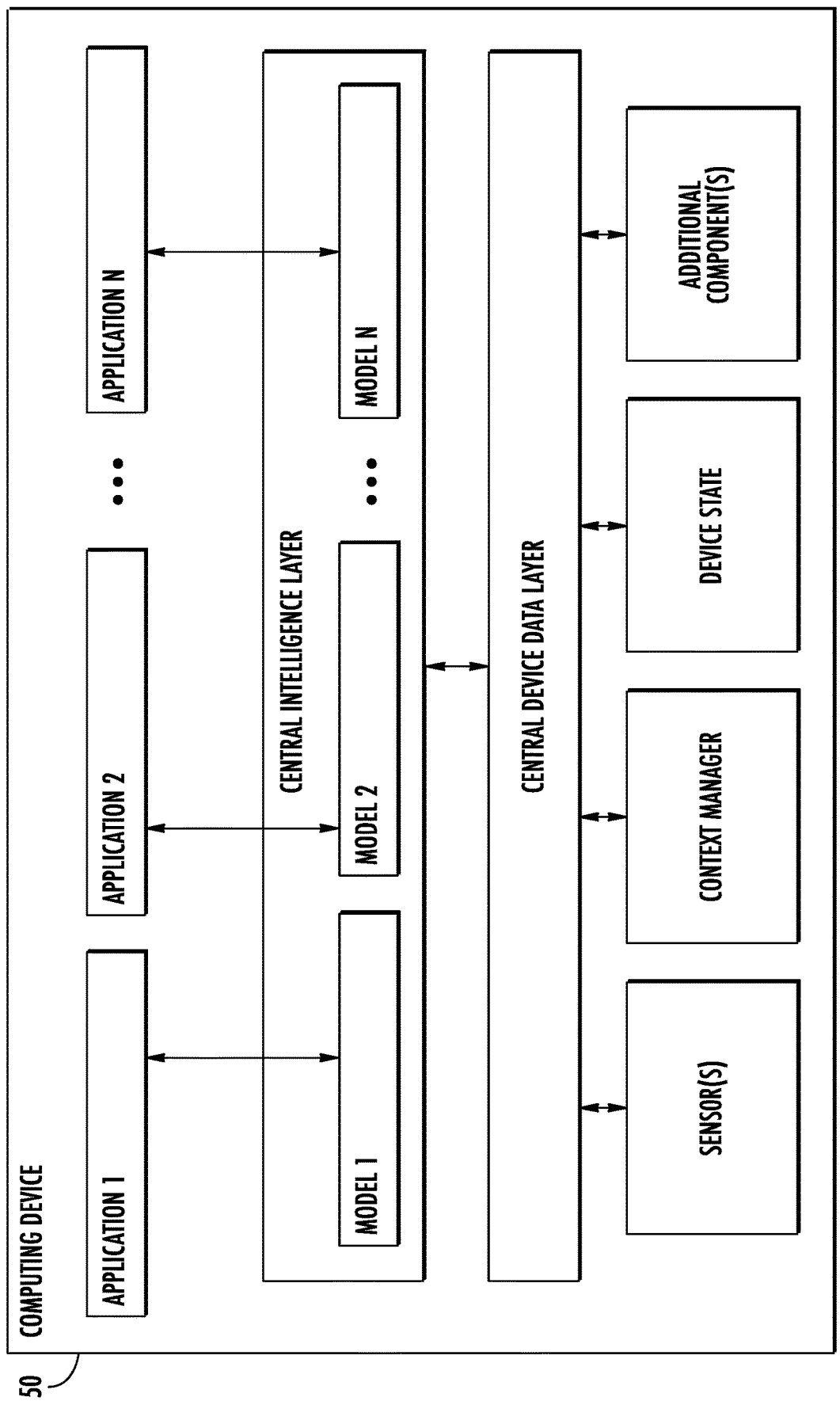
FIG. 1C depicts a block diagram of an example computing device that performs neural radiance field model training and inference according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
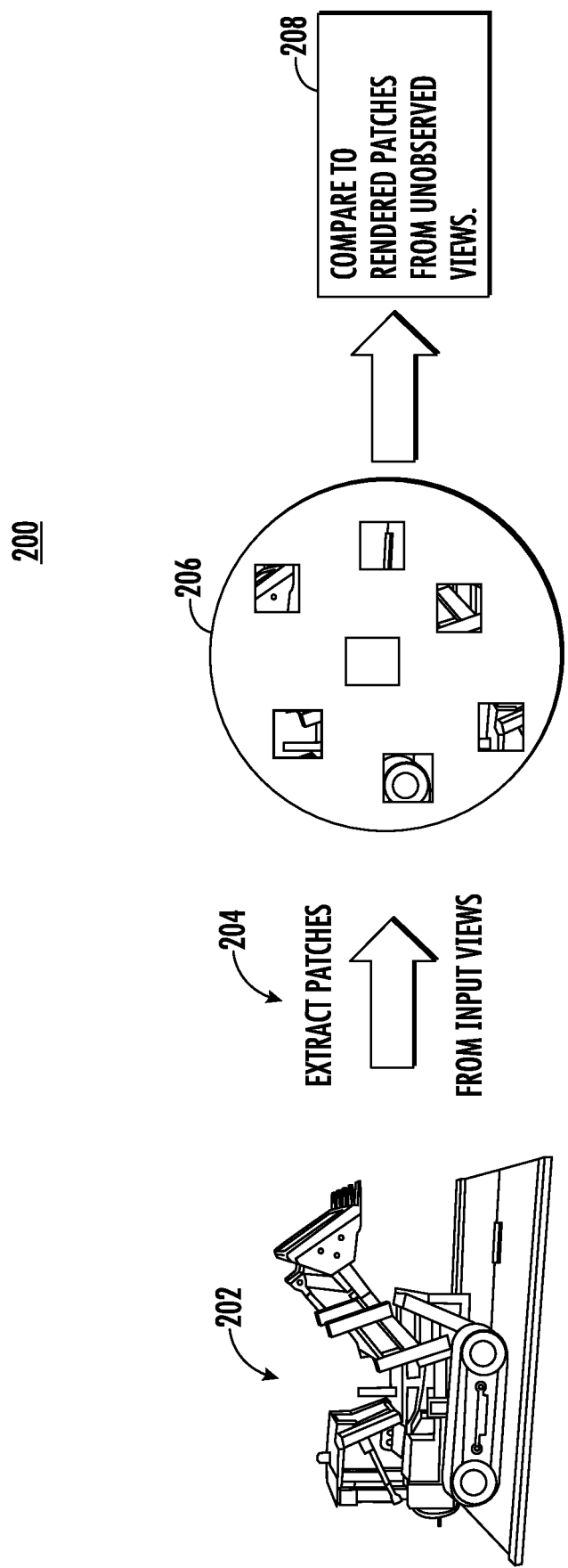
FIG. 2 depicts a block diagram of an example neural radiance field model training system according to example embodiments of the present disclosure.

FIG. 2 depicts a block diagram of an example neural radiance field model training system 200 according to example embodiments of the present disclosure. In some implementations, the neural radiance field model training system 200 is trained to receive a set of input data 202 descriptive of a scene and, as a result of receipt of the input data 202, provide a trained neural radiance field model that is operable to generate view renderings. Thus, in some implementations, the neural radiance field model training system 200 can include a patch generation model 204 that is operable to generate a plurality of patches 206 for each respective input view and input image.

The input data 202 can include an input dataset that includes a plurality of images and a plurality of locations, or positions. The plurality of images can be descriptive of a scene that is being observed, and the plurality of locations can be descriptive of locations in the observed space. For training the neural radiance field model, the neural radiance field model may process the plurality of locations and generate a plurality of outputs. The outputs can include predicted view renderings for the respective locations. Additionally and/or alternatively, the outputs can include data descriptive of color distributions and density distributions.

The plurality of images of the input data 202 (i.e., training dataset or image dataset) can be processed with the patch generation model 204 to generate a plurality of image patches 206 (e.g., a plurality of ground truth image patches). The image patches 206 can be descriptive of portions of the plurality of images. The patch generation model 204 can extract portions of the images to use for patches. The segmentation can be completed at random (e.g., via a random sampling technique) and/or with a pre-determined sequence. The image patches 206 may include overlapping pixel data or may have no overlapping pixel data. The image patches may be of the same uniform size or may vary in size. For example, each image may be deconstructed into four equal sized patches with no overlapping coverage. Alternatively and/or additionally, a focal point of an image can be determined, and various patches of varying sizes can be generated with that same image with the focal point being a center for each of the patches.

The plurality of image patches 206 can then be compared to the plurality of outputs. In some implementations, the outputs can be patch renderings that can be compared against ground truth patches that were generated with the patch generation model 204. The comparison can be completed in order to evaluate a loss function, which can output a gradient descent. The gradient descent can then be back-propagated to the neural radiance field model in order to adjust one or more parameters of the neural radiance field model.

Figure 3:
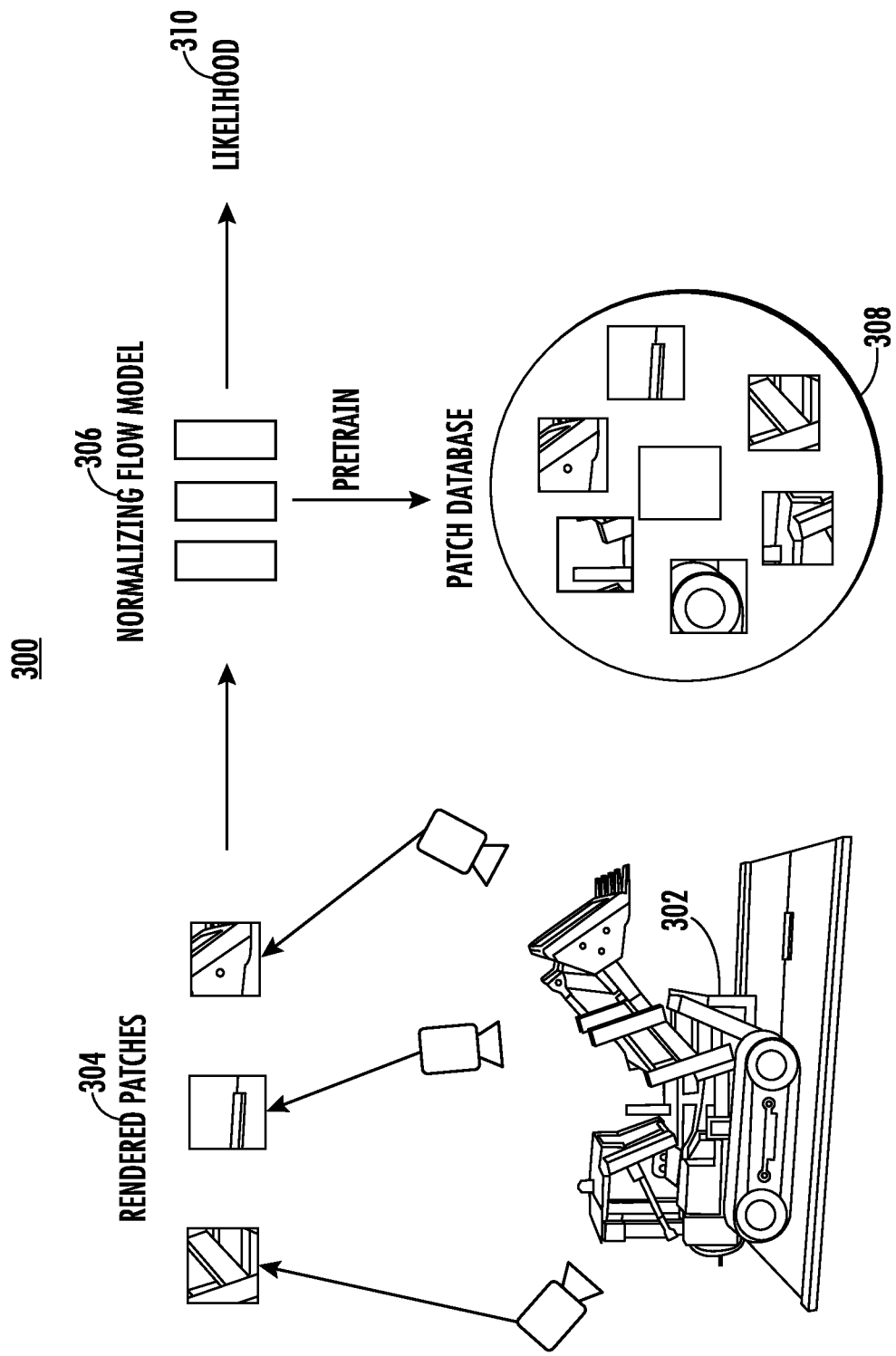
FIG. 3 depicts a block diagram of an example training system with a flow model according to example embodiments of the present disclosure.

FIG. 3 depicts a block diagram of an example training system 300 with a flow model according to example embodiments of the present disclosure. The training system 300 is similar to the neural radiance field model training system 200 of FIG. 2 except that the training system 300 further includes a flow model 306.

The training system 300 can include obtaining a density estimation model (e.g., a normalizing flow model 306) pretrained on a patch database 308. In some implementations, the patch database 308 can be generated based on a plurality of images descriptive of a plurality of different scenes. Alternatively and/or additionally, the patch database 308 can include ground truth image patches generated based on input views of a scene being modeled by the neural radiance field model. In some implementations, the patch database 308 can be replaced or supplemented with an image database (e.g., the JFT dataset). The flow model may be trained to be applied for training a plurality of different neural radiance field models in which each of the plurality of different neural radiance field models may be trained for view synthesis of different respective scenes.

The normalizing flow model 306 can then process rendered patches 304 generated by the neural radiance field model in order to generate a flow output. The flow output can then be utilized to maximize the log likelihood 310 of the rendered patches.

More specifically, FIG. 3 depicts an example training system 300 with a flow model that can be utilized to normalize an output to generate smooth transitions and minimize and/or mitigate artifact generation. The training system 300 can involve generating a database of patches 308 from the available input views 302. During training, the training system 300 can process three-dimensional locations with a neural radiance field model in order to render patches 304 from novel views and maximize the log likelihood 310 of the rendered patch 304 given the database 308 available. In order to reduce the floating artifacts, the training system 300 can add a TV norm regularization loss on the depth of the rendered patches 304.

Figure 4:
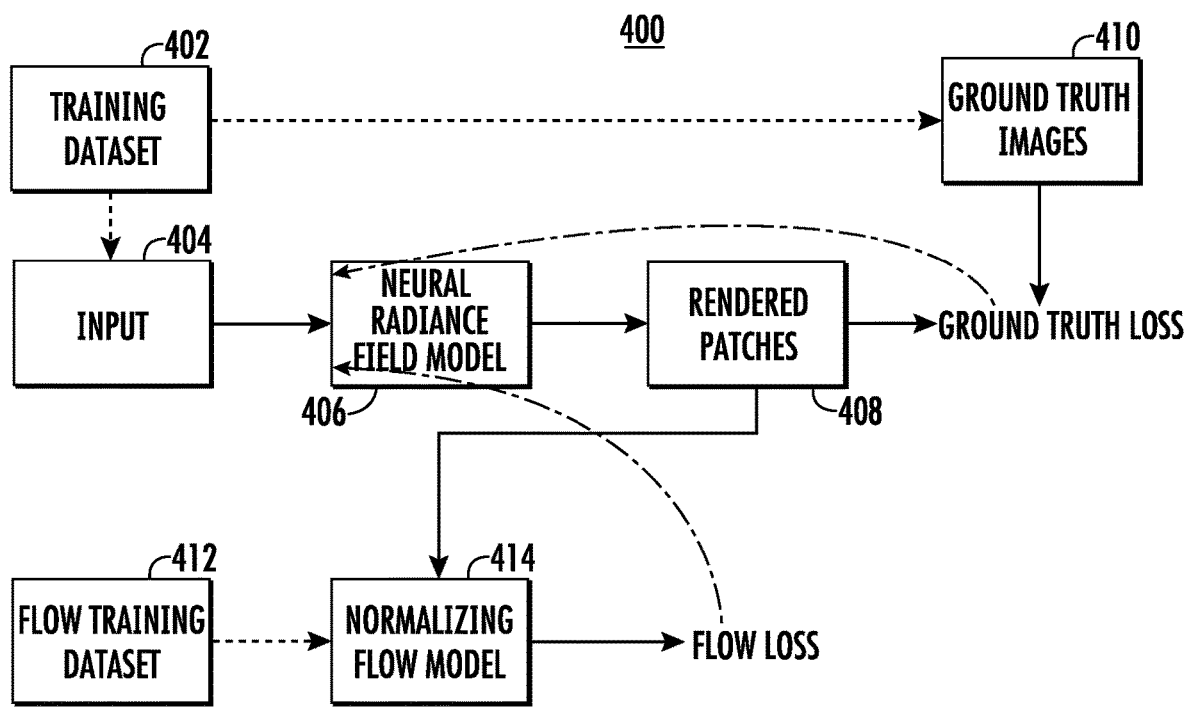
FIG. 4 depicts a block diagram of an example training system according to example embodiments of the present disclosure.

FIG. 4 depicts a block diagram of an example training system 400 according to example embodiments of the present disclosure. The example training system 400 can involve obtaining a training dataset 402. The training dataset 402 can be obtained from one or more sensors and may include one or more inputs 404 and one or more ground truth images 410. The one or more inputs 404 can include one or more locations (e.g., one or more three-dimensional positions in an observation space). Additionally and/or alternatively, the one or more inputs 404 can include one or more view directions (e.g., one or more two-dimensional view directions). Each input 404 may be associated with a particular ground truth image 410 (e.g., a location and view direction may be descriptive of the location and view direction of where a ground truth image was captured with an image sensor).

The training system 400 can include processing the input 404 with a neural radiance field model 406 to generate one or more rendered patches 408. The rendered patches 408 can then be compared against corresponding ground truth patches generated with the ground truth images 410. The rendered patches 408 and the ground truth patches can be utilized to evaluate a ground truth loss function. The output of the ground truth loss function can then be backpropagated to the neural radiance field model 406. The output can then be used to adjust one or more parameters of the neural radiance field model 406.

The rendered patches 408 can also be processed by a normalizing flow model 414 in order to generate a flow output, or flow loss. The flow output can include a gradient descent that is backpropagated to the neural radiance field model and can be used to modify one or more parameters of the neural radiance field model 406. The normalizing flow model 414 can be pretrained on a flow training dataset 412 that differs from the obtained training dataset 412. The normalizing flow model 414 can be configured to smoothen transitions in rendered images and minimize artifact generation.

The systems and methods disclosed herein can be utilized to remove floating artifacts in rendering, provide more realistic texture, and retain geometric details. Moreover, the systems and methods can include the addition of depth regularization. For example, for random viewpoints, patch renderings can be rendered, and a regularization (tv norm) can be applied on the depth of the patch.

Additionally and/or alternatively, the sampling planes can be annealed (e.g., the sampling planes can be analyzed to approximate a global optimum). In some implementations, instead of sampling evenly within the scene bounding box, the systems and methods can start with a smaller box around the center of an object, sample points within that volume, and gradually increase the size of the box to cover the full scene. Annealing the sampling planes can allow the systems and methods to avoid high density values at the beginning of the rays, which can lead to divergence in the training.

In some implementations, the systems and methods can include geometry regularization (e.g., TV-regularization on rendered depth map patches, which can be quickly anneal from high value to lower value.), color regularization (which can involve likelihood maximization of rendered 16×16 patches), near/far annealing (which can involve annealing a near/far plane to avoid degenerated solutions), reduced training iterations (e.g., training for only 50 k iterations), increased learning rate (e.g., decay from 2e-3 to 2e-5), and gradient clipping (e.g., clipping gradients (at 0.1) to allow for higher learning rate).

Figure 5:
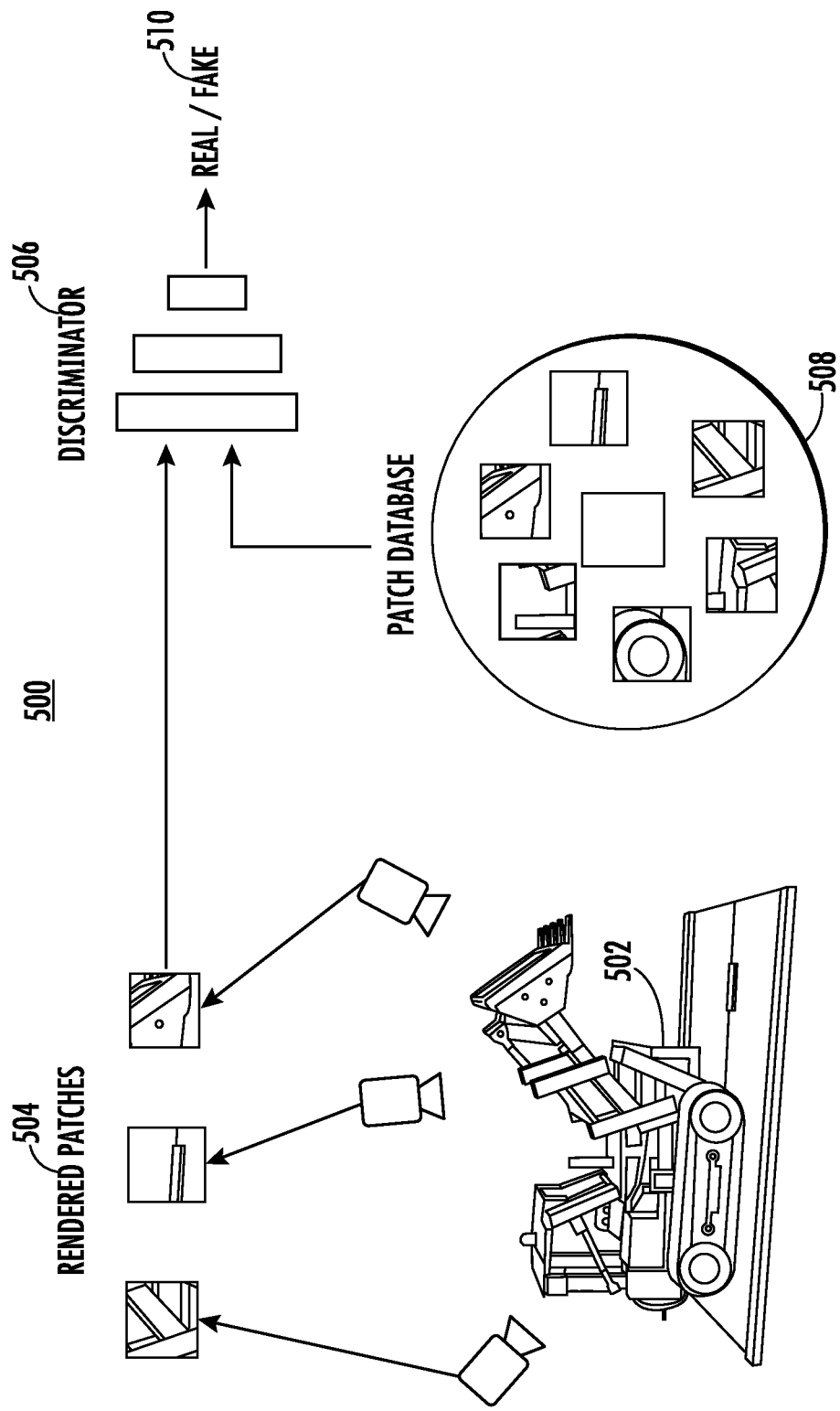
FIG. 5 depicts a block diagram of an example training system with a discriminator model according to example embodiments of the present disclosure.

FIG. 5 depicts a block diagram of an example training system 500 with a discriminator model according to example embodiments of the present disclosure. The training system 500 of FIG. 5 is similar to the training system 300 of FIG. 3 except the training system 500 of FIG. 5 includes a discriminator model 506 in place of a flow model 306.

The training system 500 can include obtaining a discriminator model 506 (e.g., a discriminator model of a generative adversarial network) pretrained on a patch database 508. In some implementations, the patch database 508 can be generated based on a plurality of images descriptive of a plurality of different scenes. Alternatively and/or additionally, the patch database 508 can include ground truth image patches generated based on input views of a scene being modeled by the neural radiance field model.

The discriminator model 306 can then process rendered patches 504 generated by the neural radiance field model in order to generate a discriminator output 510. The discriminator output 510 can be descriptive of whether the discriminator model 506 classifies the rendered patch 504 as real or fake. The discriminator output 510 can then be utilized to adjust one or more parameters of the neural radiance field model.

Example Methods

Figure 6:
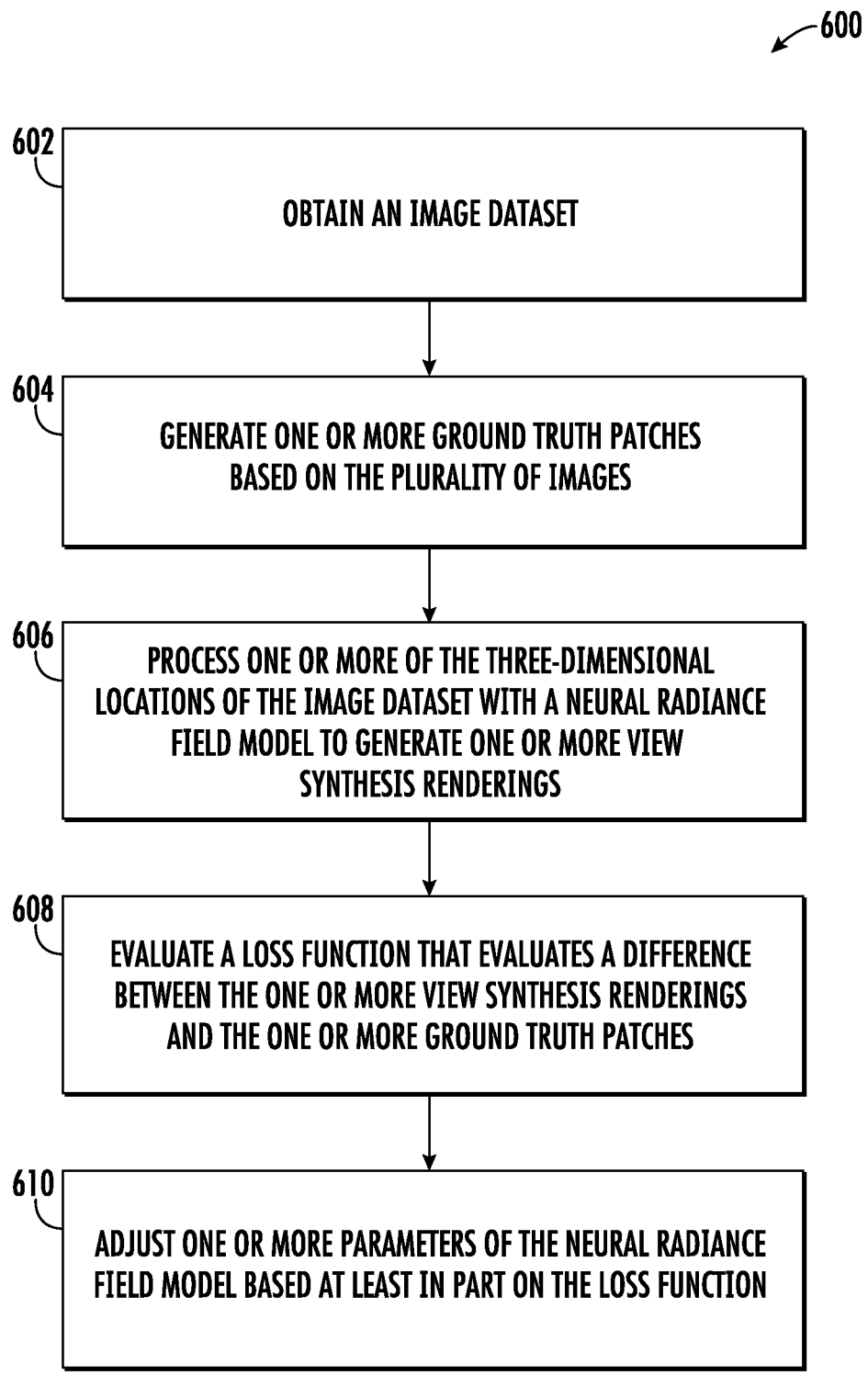
FIG. 6 depicts a flow chart diagram of an example method to perform neural radiance field model training according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain an image dataset. The image dataset can include a plurality of images and a plurality of respective three-dimensional locations, or positions. In some implementations, the plurality of images can be descriptive of different views of a scene. Each of the plurality of images may be associated with one or more of the plurality of respective three-dimensional locations. Additionally and/or alternatively, the image dataset may include a plurality of view directions associated with the plurality of images and the plurality of respective three-dimensional locations. The scene can include one or more features descriptive of one or more objects (e.g., a car in a driveway, a squirrel in a park, or person in a restaurant).

At 604, the computing system can generate one or more ground truth patches based on the plurality of images. Each ground truth patch can include a proper subset of one of the plurality of images. Generating the ground truth patches can include segmenting and/or deconstructing one or more of the images to generate a patch for different portions of the image. The patches can be utilized as individual training images or may be utilized as groups to train for particular views individually or in combination.

At 606, the computing system can process one or more of the three-dimensional locations of the image dataset with a neural radiance field model to generate one or more view synthesis renderings. The one or more view synthesis renderings can be descriptive of different views of the scene. In some implementations, the view synthesis renderings can include view synthesis patch renderings that are of the same or comparable scale to the ground truth patches.

At 608, the computing system can evaluate a loss function that evaluates a difference between the one or more view synthesis renderings and the one or more ground truth patches. The loss function can include one or more regularization terms. In some implementations, the loss function can include a perceptual loss, a photometric loss, an L2 loss, etc.

At 610, the computing system can adjust one or more parameters of the neural radiance field model based at least in part on the loss function. In some implementations, one or more generative embeddings may be modified based at least in part on the one or more view synthesis renderings and the one or more ground truth patches.

Figure 7:
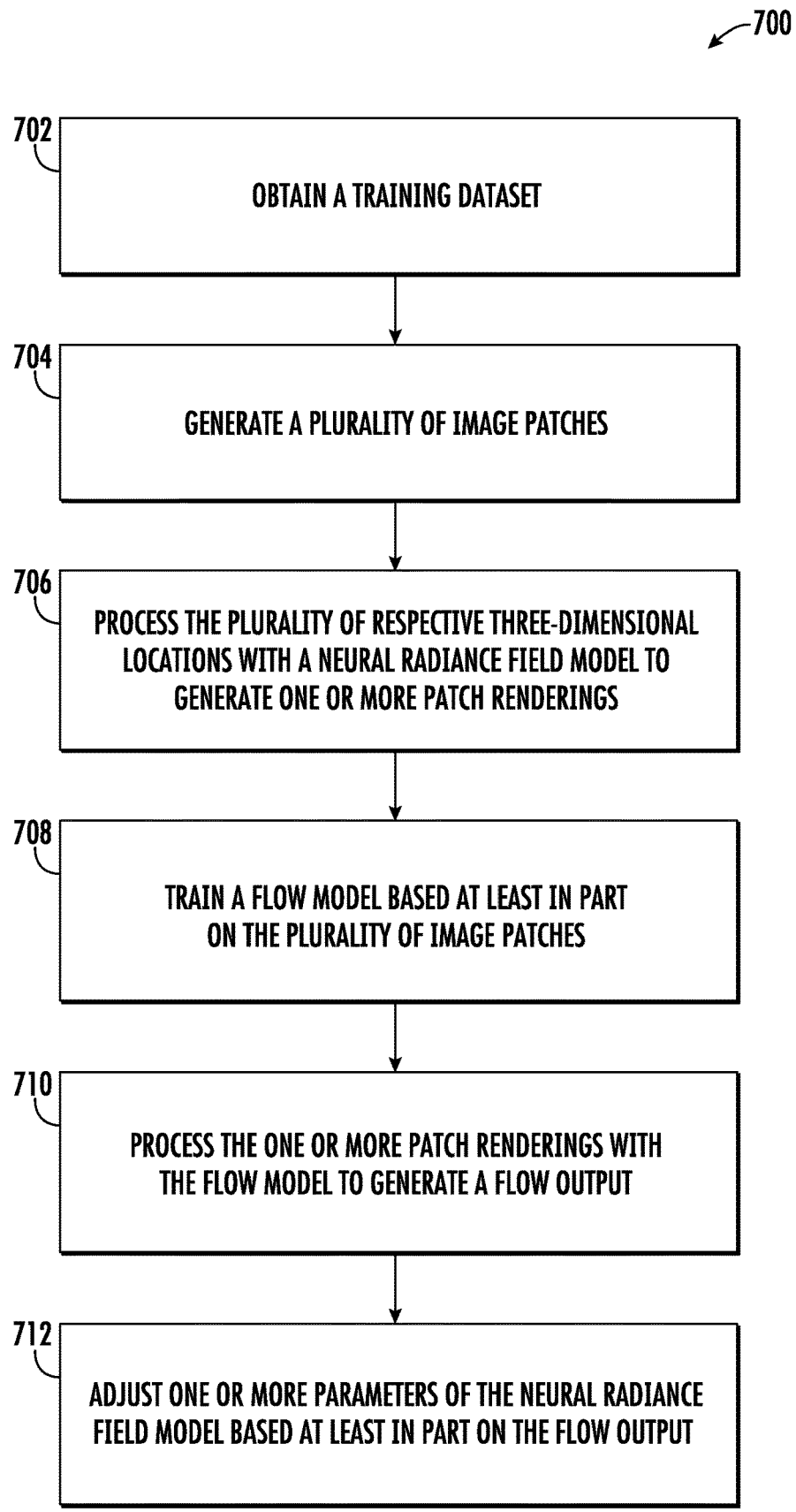
FIG. 7 depicts a flow chart diagram of an example method to perform neural radiance field model training with a flow model according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a training dataset. The training dataset can include a plurality of images and a plurality of respective three-dimensional locations. The images can be descriptive of a scene, or an environment. The three-dimensional locations can include positions in a three-dimensional observation space. The images can include red-green-blue images with a plurality of pixels with varying color values.

At 704, the computing system can generate a plurality of image patches. The plurality of image patches can include a set of image patches for each of the plurality of images, such that for each image can be utilized to generate two or more image patches. In some implementations, the images can be segmented into equal portions. Additionally and/or alternatively, portions of the images may be randomly selected for patch generation. In some implementations, each portion of each of the plurality of images may be utilized for image patch generation. Additionally and/or alternatively, the image patches may include different portions of images altogether such that each portion of an image is only utilized for that specific image patch. In some implementations, the image patches can include overlapping data. For example, one or more pixels of an image may be utilized for a plurality of image patches.

At 706, the computing system can process the plurality of respective three-dimensional locations with a neural radiance field model to generate one or more patch renderings. The neural radiance field model can include one or more multi-layer perceptrons and may be configured to map three-dimensional positions and/or view directions to one or more color values and one or more volume density values. In some implementations, the one or more patch renderings can be descriptive of views of the scene. In some implementations, the one or more patch renderings can be descriptive of predicted views associated with one or more of the three-dimensional locations. The one or more patch renderings may correspond with one or more ground truth image patches or may depict a different view altogether.

At 708, the computing system can train a flow model based at least in part on the plurality of image patches. In some implementations, the flow model may be pre-trained with an unrelated dataset. The flow model can be trained on different scenes from the scenes depicted in the ground truth images. In some, implementations, the flow model can be pre-trained on an image dataset in place of or in complement to the patch dataset.

At 710, the computing system can process the one or more patch renderings with the flow model to generate a flow output. The flow output can include a gradient descent. In some implementations, the flow output can be descriptive of a color "smoothness" and/or a geometric "smoothness" in the one or more patch renderings.

At 712, the computing system can adjust one or more parameters of the neural radiance field model based at least in part on the flow output. The parameters may be adjusted based at least in part on the gradient descent via backpropagation.

In some implementations, the method 700 and the method 600 can be utilized in parallel and/or in series. The methods can be utilized individually and/or in combination. In some implementations, the flow model can be replaced with and/or used with a discriminator model.

Figure 8:
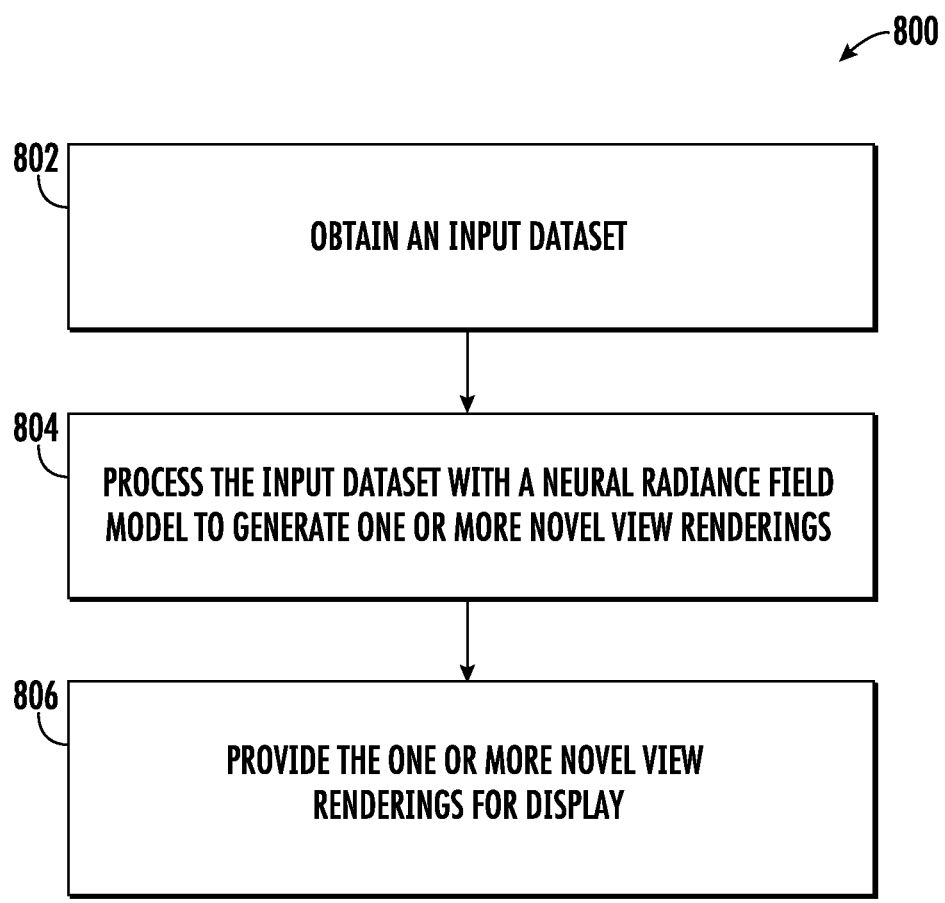
FIG. 8 depicts a flow chart diagram of an example method to perform novel view rendering generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain an input dataset. The input dataset can include one or more locations. The one or more locations can be locations not included in the training dataset for the neural radiance field model. The one or more locations may be descriptive of a position in an environment.

At 804, the computing system can process the input dataset with a neural radiance field model to generate one or more novel view renderings. The novel view rendering can include at least a portion of the environment. In some implementations the novel view rendering can be descriptive of a view that differs from the views depicted in the training dataset for the neural radiance field model. In some implementations, the neural radiance field model may have been trained by comparing patches from a training dataset to generated predicted view renderings, in which the patches may have been generated by segmenting one or more training images.

At 806, the computing system can provide the one or more novel view renderings for display. The one or more novel view renderings may be sent for visual display and may be displayed on a screen of a user device. In some implementations, the novel view rendering may be stored in a database. Additionally and/or alternatively, the novel view rendering may be utilized for training a neural radiance field model and/or a flow model.

Figure 9:
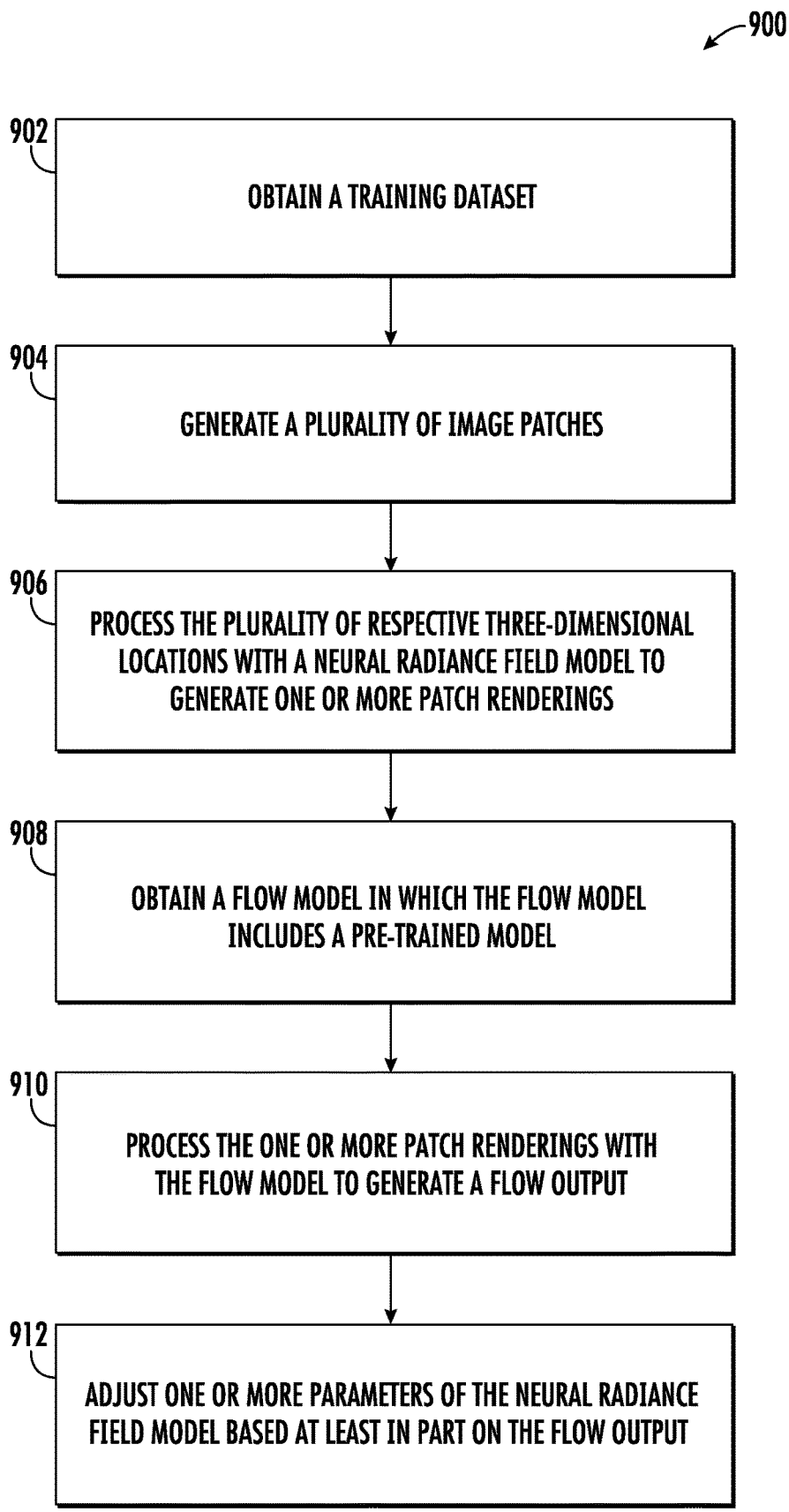
FIG. 9 depicts a flow chart diagram of an example method to perform neural radiance field model training with a flow model according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain a training dataset. The training dataset can include a plurality of images and a plurality of respective three-dimensional locations. The images can be descriptive of a scene, or an environment. The three-dimensional locations can include positions in a three-dimensional observation space. The images can include red-green-blue images with a plurality of pixels with varying color values.

At 904, the computing system can generate a plurality of image patches. The plurality of image patches can include a set of image patches for each of the plurality of images, such that for each image can be utilized to generate two or more image patches. In some implementations, the images can be segmented into equal portions. Additionally and/or alternatively, portions of the images may be randomly selected for patch generation. In some implementations, each portion of each of the plurality of images may be utilized for image patch generation. Additionally and/or alternatively, the image patches may include different portions of images altogether such that each portion of an image is only utilized for that specific image patch. In some implementations, the image patches can include overlapping data. For example, one or more pixels of an image may be utilized for a plurality of image patches.

At 906, the computing system can process the plurality of respective three-dimensional locations with a neural radiance field model to generate one or more patch renderings. The neural radiance field model can include one or more multi-layer perceptrons and may be configured to map three-dimensional positions and/or view directions to one or more color values and one or more volume density values. In some implementations, the one or more patch renderings can be descriptive of views of the scene. In some implementations, the one or more patch renderings can be descriptive of predicted views associated with one or more of the three-dimensional locations. The one or more patch renderings may correspond with one or more ground truth image patches or may depict a different view altogether.

At 908, the computing system can obtain a flow model in which the flow model includes a pre-trained model. In some implementations, the flow model may be pre-trained on a flow training dataset. The flow training dataset can include a plurality of image datasets descriptive of a plurality of different scenes. The flow training dataset can include a different dataset than the training dataset. The flow model may be utilized to train a plurality of different neural radiance field models being trained on a plurality of different respective scenes.

At 910, the computing system can process the one or more patch renderings with the flow model to generate a flow output. The flow output can include a gradient descent. In some implementations, the flow output can be descriptive of a color "smoothness" and/or a geometric "smoothness" in the one or more patch renderings.

At 912, the computing system can adjust one or more parameters of the neural radiance field model based at least in part on the flow output. The parameters may be adjusted based at least in part on the gradient descent via backpropagation.

Example Implementations

The systems and methods disclosed herein can include a patch-based approach. More specifically, in some implementations, the majority of artifacts may be caused by errors in scene geometry and divergent training start behavior. Therefore, the systems and methods disclosed herein can utilize a normalizing flow model to regularize the color of the reconstructed scene.

The novel-view synthesis task of trained neural radiance field models can be used to render unseen viewpoints of a scene for a given set of input images. Neural radiance field models can rely on having a large amount of training data to learn scenes. In real-world applications such as AR/VR, autonomous driving, and robotics, the input, however, may be sparse and only few views may be available.

The systems and methods may include a patch-based regularization to the rendered depth maps of unobserved viewpoints. The patch-based regularization can have the effect of reducing floating artifacts and gravely improving the learned scene geometry.

Additionally and/or alternatively, the systems and methods can include an annealing strategy for sampling points along the ray, where the systems and methods can first sample scene content within a small range before annealing to the full scenes, thereby preventing divergent behavior at the beginning of training.

In some implementations, the systems and methods can include a normalizing flow model to regularize the color prediction of unseen viewpoints by maximizing the loglikelihood of the rendered patches. Therefore, the systems and methods may avoid shifts in color between different views.

The optimization procedure for NeRF for sparse inputs can utilize a mip-NeRF system, which can use a multi-scale radiance field-based model to represent scenes. For sparse views, however, the quality of rendered novel views may drop for mip-NeRF mainly due to incorrect scene geometry and divergent training start behavior. Therefore, the systems and methods may utilize a patch-based approach to regularize the geometry as well as the color prediction of unseen view-points. The approach can provide a simple annealing strategy of the sampled scene space to avoid divergent training start behavior. Additionally and/or alternatively, the systems and methods can use higher learning rates in combination with gradient clipping to further speed up the optimization process. FIG. 3 depicts an example overview of one implementation of the method.

A neural radiance field can include a continuous function $f$ mapping a three-dimensional location $x \in \mathbb{R}^3$ and viewing direction $v \in \mathbb{S}^2$ to a volume density $\sigma \in \mathbb{R}^+$ and color value $c \in \mathbb{R}^3$. The neural radiance fields can be parameterized using a multi-layer perceptron (MLP) where the weights of the MLP are optimized for given input images of a scene:

$$f_\theta: \mathbb{R}^{L_x} \times \mathbb{R}^{L_d} \to \mathbb{R}^3 \times \mathbb{R}^+ \quad (1)$$

$$(\gamma(x), \gamma(d)) \to (c, \sigma)$$

where θ can indicate the network weights and γ a predefined positional encoding applied elementwise to x and d.

For volume rendering, a neural radiance field $f_\theta$ may be given, such that a pixel can be rendered by casting a ray r(t)=o+td from the camera center o through the pixel along direction d. For a given near and far bounds $t_n$, $t_f$, the pixel's predicted color value ĉ can be obtained as $$\hat{c}_\theta = \int_{t_n}^{t_f} T(t)\sigma_\theta(r(t))c_\theta(r(t)), d)dt \qquad (2)$$

$$\text{where } T(t) = \exp(-\int_{t_n}^{t} \sigma_\theta(r(s))ds)$$

where $\sigma_\theta(\cdot)$ and $c_\theta(\cdot)$ can indicate the density and color prediction of radiance field $f_\theta$, respectively. A neural radiance field may be optimized for a set of input images together with their camera poses by minimizing the mean squared error $$\mathcal{L}_{MSE}(\theta)\Sigma_{e\in\mathcal{R}}\|\hat{c}_\theta(r) - c_{GT}\|_2^2 \qquad (3)$$

where $\mathcal{R}$ can indicate the set of all rays and $c_{GT}$ the ground truth color for the pixel.

While a NeRF is utilized, only a single ray may be cast per pixel, in mip-NeRF a cone may be cast instead. The positional encoding can change from representing an infinitely small point to an integration over a volume covered by a canonical frustum. This can be a more adequate representation for scenes with various camera distances and can allow the ability to reduce NeRF's coarse and fine MLP to a single multiscale MLP increasing training speed and reducing model size. As a result, the systems and methods disclosed herein may implement the mip-NeRF representation.

In some implementations, the systems and methods may include patch-based regularization.

A NeRF model's performance may drop significantly if the number of input views is sparse. In some implementations, the systems and methods can regularize unseen viewpoints. More specifically, the systems and methods may define a space of unseen but relevant viewpoints and render small patches from these cameras. Using these patches, the key idea may be to regularize the geometry to be smooth as well as the color prediction to have a high likelihood.

To apply regularization techniques, the systems and methods may first need to define the space of unobserved viewpoints from which the system may sample camera poses. To this end, the systems and methods may make use of a set of target poses $\{P_{target}^i\}_i$ where $$P_{target}^i = [R_{target}^i | t_{target}^i] \in \mathbb{R}^{3\times 4}. \qquad (4)$$

The target poses can be assumed to be given as they can be a factor for the task of novel-view synthesis. The systems and methods may then define the space of all possible camera positions as the bounding box of all given target camera positions $$\mathcal{S}_t = \{t \in \mathbb{R}^3 \mid r_{min} \leq t \leq t_{max}\} \qquad (5)$$

where $t_{min}$ and $t_{max}$ can be the elementwise minimum and maximum values of $\{t_{target}^i\}_i$, respectively.

To obtain the sample space of camera rotations, the systems and methods may first define a common "up" direction $\bar{p}_u$ by taking the mean over the up directions of all target poses. Next, the system may calculate the mean focus point $\bar{p}_f$ for all target poses. To learn more robust representations, the system may add some jittering to the focal point before calculating the camera rotation matrix. The system can define the set of all possible camera rotations as $$\mathcal{S}_R = \{R(\bar{p}_u, \bar{p}_f + \epsilon) \mid \sim \mathcal{N}(0, 0.125)\} \qquad (6)$$

where R(·) indicates the resulting camera rotation matrix and ϵ a small jitter added to the focus point.

In some implementations, the systems and methods can regularize unseen viewpoints such that scene geometry and color prediction can include a value of highest probability.

Geometry may tend to be smooth in the real world (e.g., flat surfaces can be much more likely than high-frequency variable surfaces). Therefore, the systems and methods can include geometry regularization that may enforce depth smoothness by adding a TV prior on depth map patches from unobserved viewpoints. More specifically, the systems and methods can let $\mathcal{S}_{patch}$ be the patch size of the rendered patches from unobserved viewpoints. The expected depth of a pixel can be obtained via $$\hat{d}_\theta(r) = \int_{t_n}^{t_f} T(t)\sigma_\theta(r(t))tdt \qquad (7)$$

Further, the systems and methods can let $\hat{d}_\theta(r_{ij})$ indicate the expected depth of the ray/pixel at position (i, j) of the patch. The system can formulate a total variation loss as:

$$\mathcal{L}_{TV}(\theta) = \sum_{i,j=1}^{\mathcal{S}_{patch}-1} \|\hat{d}_\theta(r_{i,j}) - \hat{d}_\theta(r_{i+1,j})\|_2^2 + \|\hat{d}_\theta(r_{i,j}) - (r_{i,j+1})\|_2^2. \qquad (8)$$

For regularizing the color, the systems and methods can estimate the likelihood of rendered patches and can maximize the estimated likelihood during optimization. The systems and methods may make use of readily-available abundant data of unstructured image collections of two-dimensional images. While datasets of multi-view images with pose information can be expensive to collect, collections of unstructured images may be more easily accessible. The systems and methods may train a normalizing flow model on the JFT-dataset. In some implementations, the dataset can include natural images. As a result, the systems and methods can reuse the same flow model for any type of scene optimized. After training the flow model, the systems and methods can use the trained flow model to estimate the log-likelihood (LL) of rendered patches. More specifically, the systems and methods can let ϕ be the trained flow model. The system can define the color regularization loss as $$\mathcal{L}_{NLL} = -\phi(\hat{P}); \hat{P} = (\{\hat{c}_\theta(r_{ij}) \mid 0 \leq i, j \leq \mathcal{S}_{patch}\}) \qquad (9)$$

where $\hat{P}$ can indicate the predicted RGB color patch from an unobserved viewpoint.

For very sparse scenarios (e.g., 3 input views), the systems and methods may observe another failure mode of a mip-NeRF system: divergent training start behavior can lead to high density values at the ray starts. As a result, the input views may be correctly reconstructed, but novel views may be degenerated. To avoid the failure mode, the systems and methods can anneal the sampled scene space quickly over the first iterations. More specifically, the system can let n, f be the near and far plane, respectively, and m be the defined scene center (usually midpoint between n and f). The system can then define $$t_n(i) = t_m + \max(\min(\frac{i}{N_t}, 1), p_{start})(t_n - t_m) \quad (10)$$

$$t_f(i) = t_m + \max(\min(\frac{i}{N_t}, 1), p_{start})(t_f - t_m)$$

where i indicates the training iteration, $N_t$ a hyperparameter indicating after which iteration the full range should be reached, and $p_{start}$ a hyperparameter indicating with which range to start with (e.g., 0.5).

In some implementations, to allow for the high learning rate, the systems and methods may clip the gradients at a maximum value of 0:1 and at a maximum norm of 0:1. Additionally and/or alternatively, the systems and methods may train with the Adam optimizer and a learning rate of 0.002 and may exponentially decay it to 0.00002 over the optimization process.

The systems and methods for training NeRF models in data-limited regimes can include a method that leverages multi-view consistency constraints for the rendered depth maps to enforce the learning of correct scene geometry. In order to regularize the color predictions, the systems and methods may maximize the log-likelihood of the rendered patches relative to the input views using a normalizing flow model. Additionally and/or alternatively, the systems and methods can include an annealing-based ray sampling strategy to avoid divergent behavior at the beginning of training.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining an image dataset, wherein the image dataset comprises a plurality of images and a plurality of respective three-dimensional locations, and wherein the plurality of images are descriptive of a scene;
generating one or more ground truth patches based on the plurality of images, wherein each ground truth patch comprises a proper subset of one of the plurality of images;
processing one or more of the plurality of three-dimensional locations of the image dataset with a neural radiance field model to generate one or more view synthesis renderings, wherein the one or more view synthesis renderings are descriptive of different views of the scene;
evaluating a loss function that evaluates a difference between the one or more view synthesis renderings and the one or more ground truth patches;
adjusting one or more parameters of the neural radiance field model based at least in part on the loss function;
processing the one or more view synthesis renderings with a discriminator model to generate a discriminator output; and
adjusting the one or more parameters of the neural radiance field model based on the discriminator output.

2. The system of claim 1, wherein generating one or more ground truth patches comprises:
processing an image of the plurality of images to determine a portion of the image descriptive of an object in the scene; and
generating the one or more ground truth patches by segmenting the portion of the image descriptive of the object.

3. The system of claim 1, wherein the operations further comprise:
obtaining an input dataset, wherein the input dataset comprises one or more respective input locations;
processing the input dataset with the neural radiance field model to generate a novel view rendering; and
providing the novel view rendering for display.

4. The system of claim 3, wherein the plurality of images are descriptive of one or more input views of the scene; and wherein the novel view rendering is descriptive of one or more output views, wherein the one or more output views differ from the one or more input views.

5. The system of claim 1, wherein the one or more view synthesis renderings comprise one or more predicted patches.

6. The system of claim 1, wherein the loss function comprises at least one of a perceptual loss or a discriminator loss.

7. The system of claim 1, wherein adjusting the one or more parameters of the neural radiance field model comprises adjusting the one or more parameters to maximize a log likelihood of output renderings from the neural radiance field model.

8. The system of claim 1, wherein the discriminator model comprises a convolutional discriminator, and wherein the discriminator model is part of a generative adversarial network.

9. The system of claim 1, wherein the loss function comprises an adversarial loss.

10. A computer-implemented method, the method comprising:
- obtaining, by a computing system comprising one or more processors, a training dataset, wherein the training dataset comprises a plurality of images and a plurality of respective three-dimensional locations, and wherein the plurality of images depict a scene;
- generating, by the computing system, a plurality of image patches based on the plurality of images, wherein each image patch comprises a proper subset of one of the plurality of images;
- processing, by the computing system, the plurality of respective three-dimensional locations with a neural radiance field model to generate one or more patch renderings, wherein the one or more patch renderings are descriptive of views of the scene;
- obtaining, by the computing system, a flow model, wherein the flow model comprises a pre-trained model trained on a flow training dataset;
- processing, by the computing system, the one or more patch renderings with the flow model to generate a flow output; and
- adjusting, by the computing system, one or more parameters of the neural radiance field model based at least in part on the flow output.

11. The method of claim 10, further comprising:
- evaluating, by the computing system, a ground truth loss function that evaluates a difference between the one or more patch renderings and one or more of the plurality of image patches; and
- adjusting, by the computing system, one or more parameters of the neural radiance field model based at least in part on the ground truth loss function.

12. The method of claim 10, further comprising:
- storing, by the computing system, the plurality of image patches in a database.

13. The method of claim 10, wherein the one or more patch renderings comprise one or more color predictions and one or more depth predictions.

14. The method of claim 10, wherein the flow output comprises a geometry regularization.

15. One or more non-transitory computer-readable media that collectively store instructions that, when executed by one or more computing devices, cause the one or more computing devices to perform operations, the operations comprising:
- obtaining an input dataset, wherein the input dataset comprises one or more locations, wherein the one or more locations are descriptive of a position in an environment;
- processing the input dataset with a neural radiance field model to generate one or more novel view renderings, wherein the novel view rendering comprises a view of at least a portion of the environment;
- wherein the neural radiance field model has been trained by comparing patches from a training dataset to generated predicted view renderings, wherein the patches are generated by segmenting one or more training images, wherein adjusting one or more parameters of the neural radiance field model during training comprises adjusting the one or more parameters to maximize a log likelihood of output renderings from the neural radiance field model; and
- providing the one or more novel view renderings for display.

16. The one or more non-transitory computer-readable media of claim 15, wherein the neural radiance field model comprises:
- a first model configured to process an input dataset; and
- a second model configured to process a neural radiance field output generated by a neural radiance field model.

17. The one or more non-transitory computer-readable media of claim 16, wherein processing the image dataset with the neural radiance field model comprises:
- processing the input dataset with the first model to generate neural radiance field data.

18. The one or more non-transitory computer-readable media of claim 17, wherein processing the image dataset with the neural radiance field model comprises:
- processing the neural radiance field with the second model to generate the one or more novel view renderings.

19. The one or more non-transitory computer-readable media of claim 15, wherein the input dataset comprises one or more view directions.

* * * * *